US008590409B2

United States Patent
Lanz

(10) Patent No.: US 8,590,409 B2
(45) Date of Patent: Nov. 26, 2013

(54) CHANGE-SPEED GEARBOX HAVING A GEARBOX HOUSING WHICH HAS AN AUXILIARY CHAMBER

(75) Inventor: Hermann Lanz, Frickingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 168 days.

(21) Appl. No.: 13/060,295

(22) PCT Filed: Aug. 3, 2009

(86) PCT No.: PCT/EP2009/060003
§ 371 (c)(1),
(2), (4) Date: Feb. 23, 2011

(87) PCT Pub. No.: WO2010/028916
PCT Pub. Date: Mar. 18, 2010

(65) Prior Publication Data
US 2011/0146432 A1      Jun. 23, 2011

(30) Foreign Application Priority Data
Sep. 9, 2008    (DE) .......................... 10 2008 041 886

(51) Int. Cl.
*F16H 57/02*    (2012.01)
(52) U.S. Cl.
USPC .......................................... 74/329; 74/606 R
(58) Field of Classification Search
USPC .................. 74/329, 330, 333, 340, 606 R
See application file for complete search history.

(56) References Cited

U.S. PATENT DOCUMENTS

| 4,442,733 | A | * | 4/1984 | Hartz ........................ 74/606 R |
| 4,793,200 | A | | 12/1988 | McDonald |
| 5,413,014 | A | | 5/1995 | Kameda et al. |
| 5,966,998 | A | | 10/1999 | Hara et al. |
| 6,622,839 | B2 | * | 9/2003 | Kundermann et al. ...... 192/48.9 |
| 7,305,906 | B2 | | 12/2007 | Sander |

FOREIGN PATENT DOCUMENTS

| DE | 198 11 874 A1 | 11/1998 |
| DE | 103 16 321 A1 | 10/2004 |
| DE | 103 26 866 A1 | 12/2004 |
| DE | 10 2006 046 176 A1 | 4/2008 |
| JP | 9-264403 A | 10/1997 |

* cited by examiner

*Primary Examiner* — Ha D Ho
(74) *Attorney, Agent, or Firm* — Davis & Bujold, PLLC; Michael J. Bujold

(57) ABSTRACT

A change-speed gearbox of a motor vehicle having a drive input and a drive output shaft which are mounted in a main chamber of a gearbox housing and by which a power flow can be transmitted by the selective actuation of clutches such that, parallel to the drive input and output shafts, an intermediate shaft with an intermediate gearwheel is arranged in an auxiliary chamber of the gearbox housing which communicates with the main chamber, so that when the shifting device is appropriately actuated, a power flow is directed from the drive input shaft, via the intermediate gearwheel of the intermediate shaft, to the drive output shaft to produce a reverse rotation direction of the drive output shaft. The auxiliary chamber, accommodating the intermediate shaft, has a bell-shaped longitudinal section with an oval cross-section.

10 Claims, 3 Drawing Sheets

CHANGE-SPEED GEARBOX HAVING A GEARBOX HOUSING WHICH HAS AN AUXILIARY CHAMBER

This application is a National Stage completion of PCT/EP2009/060003 filed Aug. 3, 2009, which claims priority from German patent application serial no. 10 2008 041 886.2 filed Sep. 9, 2008.

FIELD OF THE INVENTION

The invention concerns a change-speed gearbox of a motor vehicle with a drive input shaft and a drive output shaft, which are mounted in a main chamber of a gearbox housing and by means of which, by virtue of mutually meshing gearwheel pairs, a power flow can be directed by the selective actuation of clutches by a shifting device, such that parallel to the drive input and drive output shafts an intermediate shaft with an intermediate gearwheel is arranged in an auxiliary chamber of the gearbox housing connected to the main chamber, so that when the shifting device is actuated appropriately a power flow from the drive input shaft via the intermediate gearwheel of the intermediate shaft to the drive output shaft produces a rotation direction reversal of the drive output shaft.

BACKGROUND OF THE INVENTION

In change-speed gearboxes for motor vehicles, the rotation direction reversal of the drive output shaft required for reversing the vehicle is usually produced by an intermediate gearwheel arranged on an intermediate shaft in the gearbox housing. This intermediate gearwheel is then subjected to particularly large loads since it meshes simultaneously with two associated gearwheels, on the one hand with an associated gearwheel of the drive input shaft or countershaft, and on the other hand with a gearwheel of the drive output shaft.

This high loading of the intermediate gearwheel results in severe stressing of the intermediate shaft and the mountings of the intermediate shaft, and ultimately also of the gearbox housing in the area of the bearing points. To counteract pronounced deflection of the intermediate shaft, which would otherwise lead to flank-line deviations in the meshing of the intermediate gearwheels, and in order to withstand the high loads, the gearbox housing must have high strength in the area of the intermediate shaft.

A change-speed transmission with a transmission housing of this type is known from DE 103 16 321 A1, in which an intermediate shaft with an intermediate gearwheel for producing a rotation direction reversal of the drive output shaft is located in a main chamber and parallel to the axes of the drive input and drive output shafts. In this case the intermediate shaft is located on one side in a recess of the transmission housing and on the other side it is secured on the transmission housing by a half-shell and bolted joint. As a whole, the intermediate shaft with its intermediate gearwheel is arranged in a bulge of the transmission housing.

A disadvantage of such an arrangement is that the manner of fixing the intermediate shaft in the transmission housing, in contrast to mounting the shaft in massive walls of the transmission housing, is characterized by lower strength. Furthermore, to produce the bulge in the main chamber which accommodates the intermediate shaft correspondingly more material is used, and this ultimately also increases the manufacturing cost and effort.

Furthermore, from DE 198 11 874 C2 a change-speed transmission with a transmission housing is known, in which the intermediate shaft with its intermediate gearwheel are located in a rectangular auxiliary chamber positioned laterally on the main chamber. In this case there is an aperture between the main and the auxiliary chambers, through which the intermediate gearwheel is in contact with the two associated gearwheels, respectively of the drive input and drive output shafts. To position and mount the intermediate gearwheel in the auxiliary chamber, the auxiliary chamber has a rectangular opening which is sealed by a bolted-on cover once assembly has been completed.

Such an arrangement has the disadvantage that the rectangular cross-section of the auxiliary chamber results in notch stresses in this housing area, this effect being reinforced still more by the threaded bores of the cover. Moreover, the bolted attachment of the housing cover results in additional manufacturing cost and effort.

SUMMARY OF THE INVENTION

Accordingly, the purpose of the present invention is to provide a change-speed gearbox for a motor vehicle, whose gearbox housing enables a possible arrangement of the intermediate shaft with its intermediate gearwheel characterized by the greatest possible strength along with low manufacturing cost and effort.

The invention embodies the technical principle that the auxiliary chamber accommodating the intermediate shaft has a bell-shaped longitudinal section with an oval cross-section. By designing the auxiliary chamber in this manner no notch stresses are formed, whereas due to the oval cross-section a corresponding transition to the main chamber of the gearbox housing can be provided, which results in a strength improvement. In addition, such a design is characterized by optimum use of the space available, which results in better use of material and thus also reduces manufacturing cost.

In this case the term 'oval' means a design of the cross-section of the auxiliary chamber as a circle, but also any other contour made up with individual radii.

In accordance with an advantageous embodiment of the invention the auxiliary chamber changes smoothly along its bell-shaped longitudinal section, starting from a circular cross-section into an elliptical cross-section in the area of the main chamber. This has the advantage that owing to the initially circular cross-section a closing cover of the auxiliary chamber can be of simple design, whereas in the area of the main chamber and therefore in the area of the intermediate shaft and the intermediate gearwheel the walls of the auxiliary chamber can draw closer to the intermediate gearwheel. This allows the auxiliary chamber to be designed very compactly, which also leads to a compact structure of the transmission housing as a whole. In this case the term 'elliptical' means a contour similar to an elongated circle, with different radii in the direction of the axis of the intermediate shaft and perpendicular thereto.

Advantageously, the shorter extension of the elliptical cross-section of the auxiliary chamber is directed parallel to the longitudinal axis of the intermediate shaft and has an order of magnitude in the range of the axial extension of the intermediate gearwheel. This means that the walls of the auxiliary chamber are drawn in very close to the intermediate gearwheel, whereby radial forces are transferred to the housing closer in the area of the intermediate gearwheel. This results in a smaller deflection of the intermediate shaft, and thus also in less distortion of its holding bores in the gearbox housing.

In a further development of the invention, a transition of the auxiliary chamber into the main chamber has a size in the range of the radial extension of the intermediate gearwheel.

Thanks to this measure the aperture through to the main chamber can be made as small as possible, which leads to a further increase of strength.

In a further advantageous embodiment of the invention the auxiliary chamber is sealed by a cover with an integrated seal. This has the advantage of facilitating the fitting of the cover since there is no need to ensure correct alignment of the cover and a separate seal arranged under it.

In a further development of the invention, the cover is secured onto the gearbox housing by means of a circlip. This enables the cover to be fixed securely to the gearbox housing while at the same time eliminating bolt joints and their strength-reducing effect.

According to another design feature of the invention, the integrated seal is in the form of an elastomeric seal. Advantageously, this ensures secure sealing of the auxiliary chamber of the change-speed gearbox.

In a further development of the invention the cover is designed as a component produced by deformation. This measure enables the cover to be produced at low cost.

According to a further advantageous embodiment of the invention, the change-speed gearbox is designed in the manner of a countershaft transmission. This makes the change-speed gearbox particularly suitable for longitudinal fitting into a motor vehicle, since a coaxial arrangement of the drive input and drive output shafts is possible.

BRIEF DESCRIPTION OF THE DRAWINGS

Below, further invention-improving features are explained in more detail, together with the description of a preferred embodiment of the invention, with reference to the figures, which show.

DETAILED DESCRIPTION OF THE PREFERRED EMBODIMENTS

Figure 1:
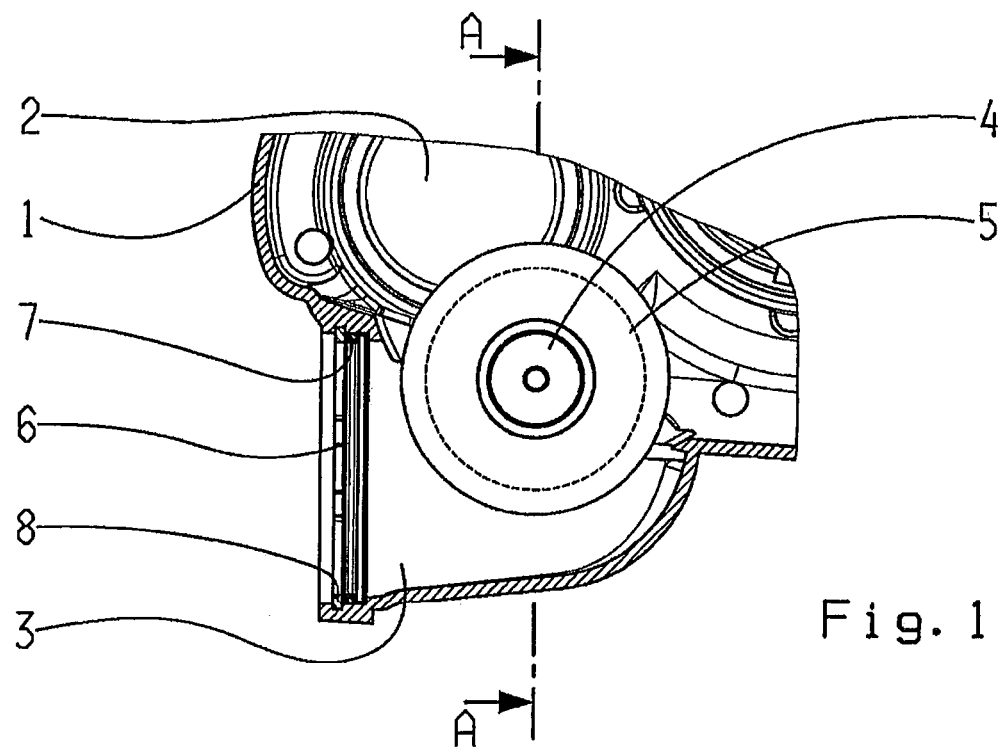
FIG. 1: a longitudinal section of a gearbox housing of the change-speed gearbox according to the invention, showing the area of an auxiliary chamber.

FIG. 1 shows a longitudinally sectioned view of a gearbox housing 1 of the change-speed gearbox according to the invention, which comprises a main chamber 2 and an auxiliary chamber 3. The main chamber 2 and the auxiliary chamber 3 are connected to one another via a transition in which an intermediate shaft 4 with an intermediate gearwheel 5 is located. The transition is designed such that there is sufficient space in it for the intermediate gearwheel 5 with its radial extension. A bell-shaped longitudinal section of the auxiliary chamber 3 is delimited on the one hand by the transition into the main chamber 2 and on the other hand by a cover 6. In its outer radial area the cover 6 has an integrated elastomer seal 7 and is held in position by a securing ring 8 located in a corresponding recess of the auxiliary chamber 3.

Figure 2:
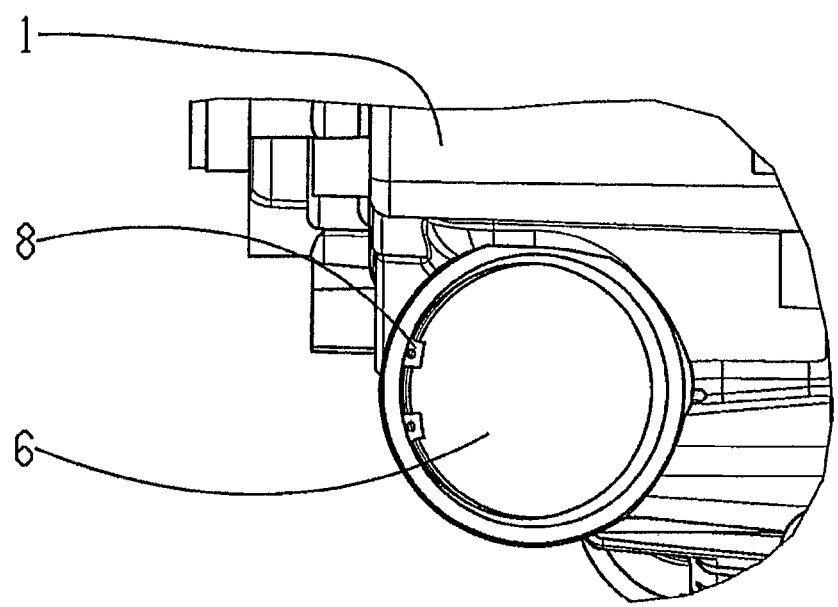
FIG. 2: a plan view of the auxiliary chamber of the gearbox housing in FIG. 1.
Figure 3:
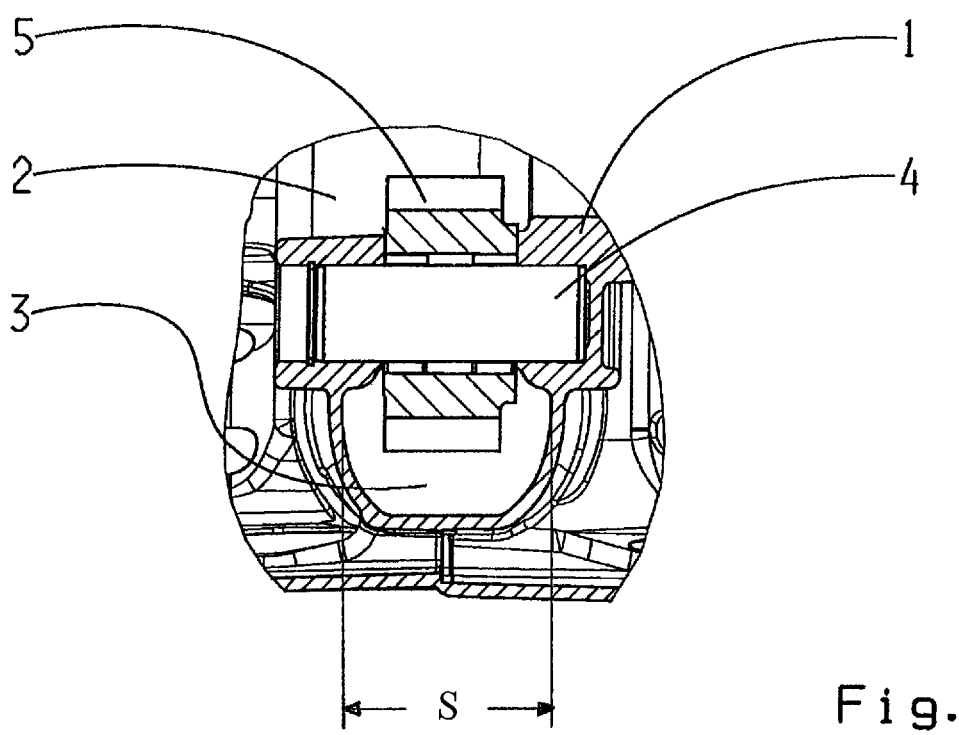
FIG. 3: a side view of the auxiliary chamber of the gearbox housing, sectioned along the line A-A in FIG. 1.
Figure 4:
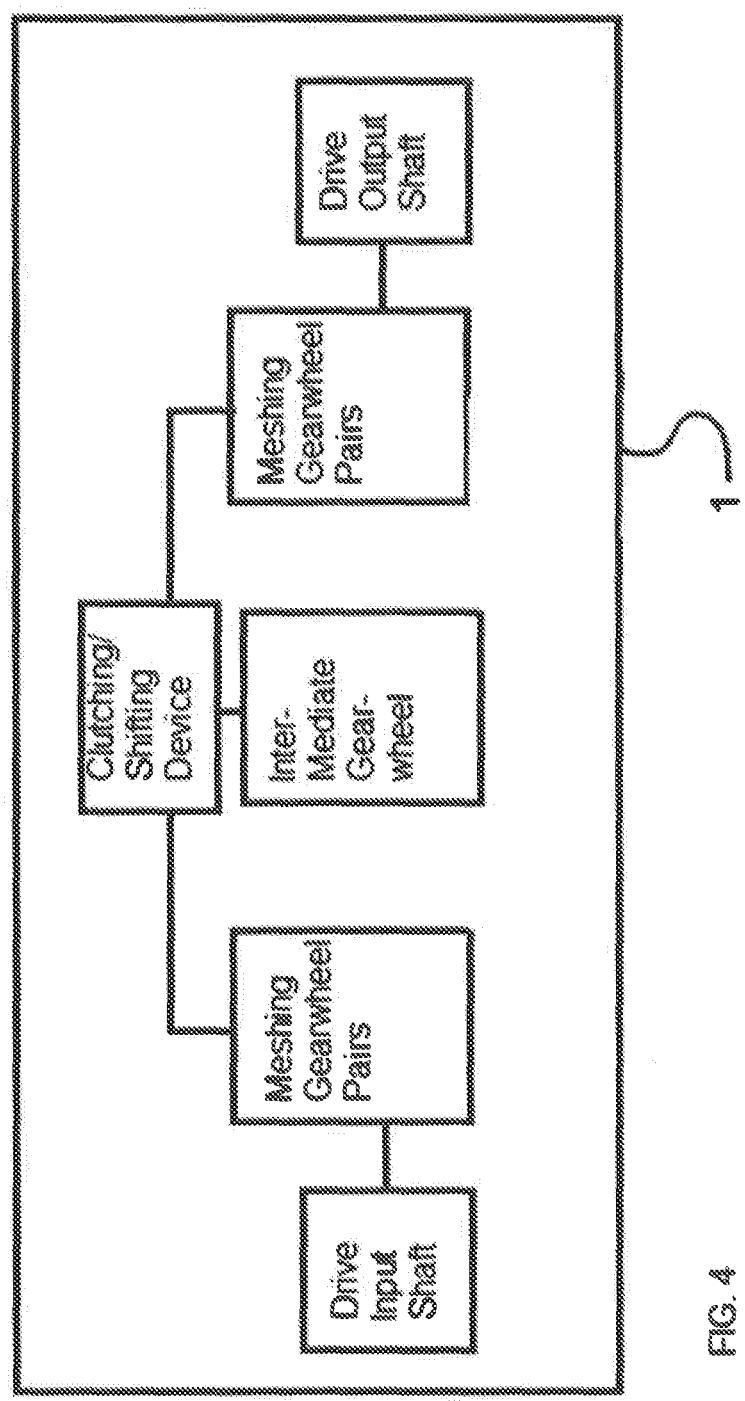
FIG. 4: a diagrammatic view of various components of the transmission according to the invention.

As can be seen from FIG. 2, in the area of the cover 6 the auxiliary chamber 3 has a circular cross-section, while in contrast, in the direction of the transition to the main chamber 2 it changes smoothly to an elliptical cross-section which can be seen in FIG. 3. As can also be seen in FIG. 3, in this case a shorter extension S of the elliptical cross-section of the auxiliary chamber 3 is of an order of magnitude in the range of an axial extension of the intermediate gearwheel 5. FIG. 4 diagrammatically shows the various components of the transmission according to the invention.

By virtue of such a design of the auxiliary chamber 3, it is possible to configure a receiving space in the gearbox housing for the intermediate shaft 4 with the intermediate gearwheel 5, which has high strength but despite this, involves low production cost and effort.

INDEXES

1 Gearbox housing
2 Main chamber
3 Auxiliary chamber
4 Intermediate shaft
5 Intermediate gearwheel
6 Cover
7 Elastomeric seal
8 Circlip
s Shorter extension of the elliptical cross-section

The invention claimed is:

1. A change-speed gearbox for a motor vehicle comprising:
a drive input and a drive output shaft being mounted in a main chamber (2) of a gearbox housing (1) and by which, via meshing gearwheel pairs, power flow can be transmitted by selective actuation of clutches by a shifting device, an intermediate shaft (4) with an intermediate gearwheel (5), for produce a reverse rotational direction of the drive output, being arranged in an auxiliary chamber (3) of the gearbox housing (1) and the auxiliary chamber (3) communicating with the main chamber (2), the intermediate shaft (4) being parallel to the drive input and the drive output shafts such that, when the shifting device is appropriately actuated, the power flow being directed from the drive input shaft, via the intermediate gearwheel (5) of the intermediate shaft (4), to the drive output shaft to produce the reverse rotational direction of the drive output shaft, and
wherein the auxiliary chamber (3), accommodating the intermediate shaft (4), has a bell-shaped longitudinal section with an oval cross-section.

2. The change-speed gearbox according to claim 1, wherein, along the bell-shaped longitudinal section, the auxiliary chamber (3), starting from a circular cross-section, changes smoothly to an elliptical cross-section in an area of the main chamber (2).

3. The change-speed gearbox according to claim 2, wherein a shorter extension (S) of the elliptical cross-section of the auxiliary chamber (3) is parallel to a longitudinal axis of the intermediate shaft (4) and is of an order of magnitude in a range of an axial extension of the intermediate gearwheel (5).

4. The change-speed gearbox according to claim 1, wherein a transition of the auxiliary chamber (3) into the main chamber (2) is of a size in a range of a radial extension of the intermediate gearwheel (5).

5. The change-speed gearbox according to claim 1, wherein the auxiliary chamber (3) is sealed by a cover (6) with an integrated seal.

6. The change-speed gearbox according to claim 5, wherein the cover (6) is secured onto the gearbox housing (1) by a circlip (8).

7. The change-speed gearbox according to claim 5, wherein the integrated seal is an elastomeric seal (7).

8. The change-speed gearbox according to claim 5, wherein the cover (6) is a formed component which is produced by deformation.

9. The change-speed gearbox according to claim 1, wherein the gearbox is designed as a countershaft transmission.

10. A motor vehicle comprising a change-speed gearbox comprising:
 a drive input shaft and a drive output shaft being mounted in a main chamber (2) of a gearbox housing (1) and by which, via meshing gearwheel pairs, a power flow can be transmitted by selective actuation of clutches by a shifting device, an intermediate shaft (4) with an intermediate gearwheel (5), for produce a reverse rotational direction of the drive output, being arranged in an auxiliary chamber (3) of the gearbox housing (1) and the auxiliary chamber (3) communicating with the main chamber (2), the intermediate shaft (4) being parallel to the drive input and the drive output shafts such that, when the shifting device is appropriately actuated, the power flow being directed from the drive input shaft, via the intermediate gearwheel (5) of the intermediate shaft (4), to the drive output shaft to produce the reverse rotational direction for the drive output shaft, and
 wherein the auxiliary chamber (3), accommodating the intermediate shaft (4), has a bell-shaped longitudinal section with an oval cross-section.

\* \* \* \* \*